Nov. 26, 1968 R. G. WILMER 3,412,836
FRICTION DISC OF SEGMENTED ELEMENTS
Filed March 6, 1967 3 Sheets-Sheet 1

INVENTOR.
RUDOLPH G. WILMER
BY
*Fryer, Zimmerld, Fix & Phillips*
ATTORNEYS

INVENTOR.
RUDOLPH G. WILMER

Nov. 26, 1968    R. G. WILMER    3,412,836
FRICTION DISC OF SEGMENTED ELEMENTS

Filed March.6, 1967    3 Sheets-Sheet 3

INVENTOR.
RUDOLPH G. WILMER
BY
ATTORNEYS

United States Patent Office 3,412,836
Patented Nov. 26, 1968

3,412,836
FRICTION DISC OF SEGMENTED ELEMENTS
Rudolph G. Wilmer, Peoria, Ill., assignor to Caterpillar Tractor Co., Peoria, Ill., a corporation of California
Filed Mar. 6, 1967, Ser. No. 620,752
5 Claims. (Cl. 192—107)

ABSTRACT OF THE DISCLOSURE

A friction disc formed from a plurality of independent, friction-faced segments individually keyed circumferentially about the periphery of a circular member in axial slots so that the movement of each segment is independent of any other segment and loads are interchanged between the segment and the circular member via the key connection between them. The key connection prevents the segments from radially separating from the circular member.

Background of the invention

Control of relative rotational movement between adjacent rotating members is often accomplished through the use of friction discs. Typical of the more conventional applications are brakes and clutches, including those in transmission units of vehicles. Normally in these applications the friction disc is clamped between a plate mounted on one member and a movable plate mounted on the opposite side of the disc. When the disc is "clamped" between these members an interchange of torque between the disc and the members is accomplished.

When friction discs are used in clutches they are subjected to engine vibrations, transit machine vibrations and oscillations induced by loading during engagement and release of the friction disc. Also, considerable heat is generated by the "rubbing" of the disc on the plate members causing thermal stresses.

From a computer study it was determined that a conventional friction disc vibrates between an elliptical shape and its normal circular shape in a manner determined by its own mode of vibration. Engine torsional vibration is the largest contributing factor to this situation, with the other conditions being somewhat less critical. The continual fluctuation caused stress cracks in and flaking off of the friction material. Further, the metal supporting disc itself often develops stress cracks further compounding the situation. Various attempts have been made to resolve these problems, such as making the discs thinner, thicker, and by cutting stress relief slots in the friction material. Further, metallurgical and bonding changes have been made in the friction discs, but with only a limited degree of success in combating the problems.

Another problem in conventional clutches is disclosed in U.S. Patent 2,259,461 issued to Eason, which is misalignment. Misalignment occurs when the clutch engages and under a misaligned condition the maximum friction surface area of the disc is not utilized. This results in an undue amount of slippage with accompanying generation of excess heat.

A typical friction disc is shown in U.S. Patent 2,767,817 issued to Davis, wherein removable segments of friction material are inserted into channels on a supporting metal disc. Other designs employ a composite thin ring of friction material with slots cut in the area of the channels to reduce the problems noted above.

A considerable amount of research has been done in the construction of disc brakes, such as that disclosed in U.S. Patent 3,237,731 issued to Du Bois, showing a segmented brake disc which is keyed inside a hollow wheel shell. This construction, as well as similar ones, such as those wherein the segments are keyed to one another, as disclosed in U.S. Patent 2,423,882 issued to Frank, are not usually employed in clutch operations due to their bulk and requirement of a cylindrical outside shell. For example, such a structure would be impractical in the transmission shown in U.S. Patent 3,096,667 issued to Dickeson et al. Further, some of these constructions have very loose-fitting mounting arrangements that would fatigue due to engine vibrations if these types of structures are employed in clutch and transmission assemblies.

Summary

In general, it has been found that a very economical friction disc construction can be accomplished by forming such a disc from a plurality of friction-faced segments which can be blanked out of strip stock material, and attaching these segments to the periphery of a circular member in key slots in a manner that each segment will be completely independent of the others. A plurality of these segments, when positioned circumferentially about the periphery of the cylindrical member in key slots, form an annular friction disc. The inboard edge of each segment on opposite sides of the key connection serves as a bearing surface against the periphery of the cylindrical member so that the torque loads are interchanged between each segment, and the disc, through the key connection, and the inboard edge on one side of the segment depending on the relative rotational direction of the members. Various key connections can be used, such as a dovetail connection, a circular key, or other similar arrangement.

During disengaged operations, the individual segments are held outwardly by the centrifugal force acting on each segment and will be retained on the cylindrical member through their key connection.

This arrangement reduces the amount of vibration transmitted to the individual segments, prevents the disc formed by the segments from having a resonant mode of vibration, and allows each segment to align precisely in its axial slot when engagement occurs.

Description of an embodiment

Figure 1:
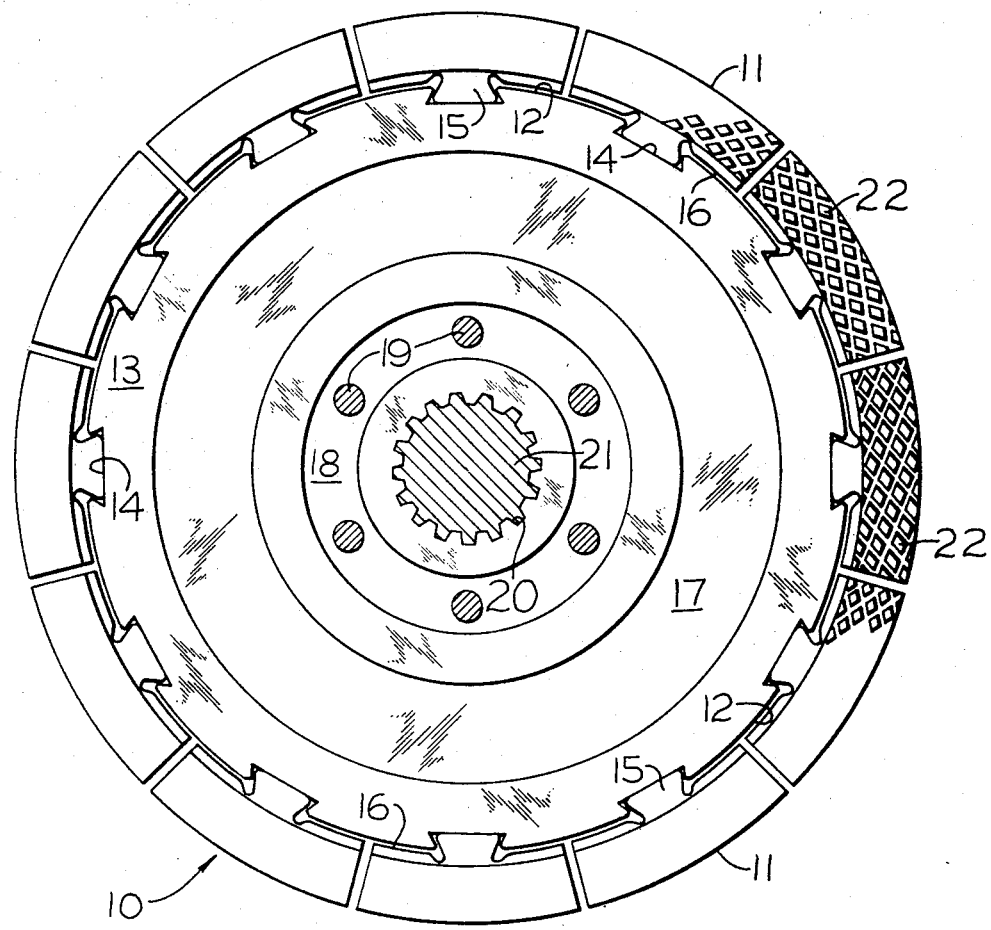
FIG. 1 is a plan view of a novel friction disc fabricated according to this invention by keying a plurality of friction-faced segments about the periphery of a support disc.

In the plan view shown in FIG. 1 the construction of the novel friction disc 10 is detailed. A plurality of friction-faced segments 11 are mounted about the periphery 12 of a circular member 13 in axial grooves or slots 14. A key 15 on the inboard edge 16 of each segment is received in its groove or slot so that the segment can be moved axially wtih reference to the rotational axis of the circular member, but is retained against outward radial movement by the key connection. Centrifugal force therefore cannot dislodge the segments from their slots.

Circular member 13 is typically employed with a disc of conventional construction having a web 17 connecting it with a hub 18 mounted thereon with fastenings 19. The hub is equipped with a spline bore 20 for mounting it on a splined shaft 21. Alternatively, the circular member may be the outer portion of the ring gear, such as a planetary gear arrangement such as shown in U.S. Patent 3,096,667 issued to Dickeson, or some similar structure as would readily suggest itself to one skilled in the art.

Figure 2:
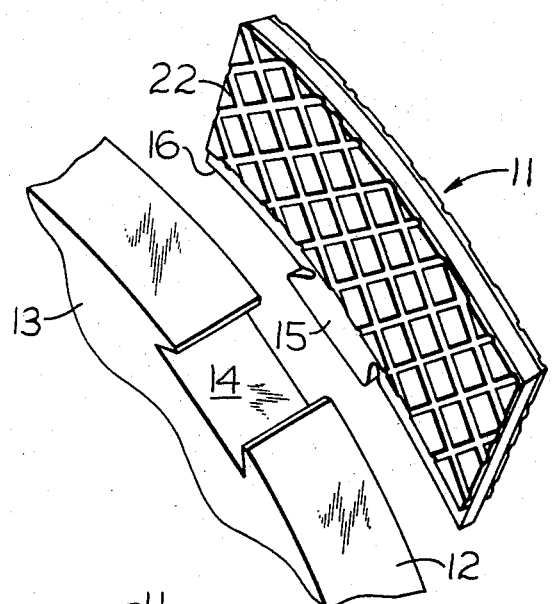
FIG. 2 is a broken away perspective showing a portion of the disc between the periphery of the circular members and its associated friction-faced segment.

The construction of the individual friction-faced segment 11 can be more easily seen in FIG. 2 as well as the way it key-connects to the circular member 13. Typically, the segment is blanked from a piece of strip stock material which has been faced with friction material 22. The friction material is preferably bonded to the segment above the key 15, but could be fastened thereto with rivets or the like. Also, if desired, the segment may be blanked from strip stock prior to the bonding of the friction material thereon.

Figure 6:
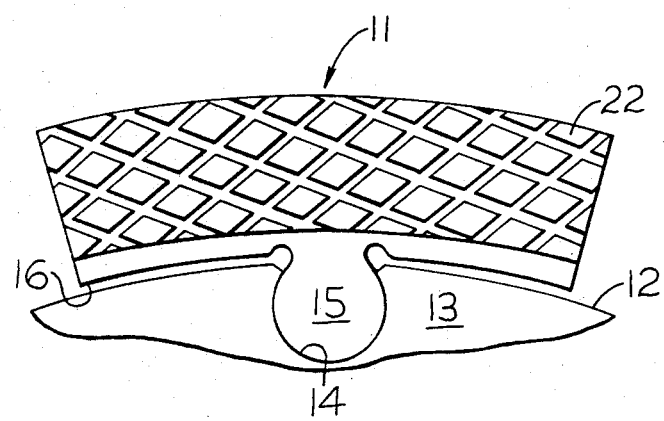
FIGS. 6 and 7 show alternate keyed connections between the segments and the periphery of the cylindrical member.
Figure 7:
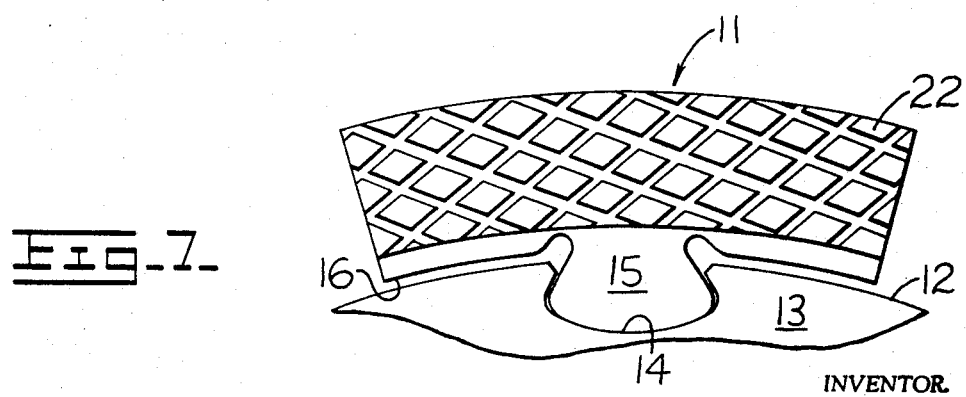

Normally, the blanking operation is accomplished leaving a minimum radius of 1/8 inch on dovetails, such as shown in FIG. 2, in order to provide greater surface contact. However, if key connections, such as those shown in FIGS. 6 and 7 are used, the fit between the key 15 and its associated groove or slot 14 can be varied accordingly. Generally, a reasonably loose fit is desired so that the individual segment can move freely axially in its groove so that it may achieve proper alignment between the pressure plates where it is employed.

Figure 5:
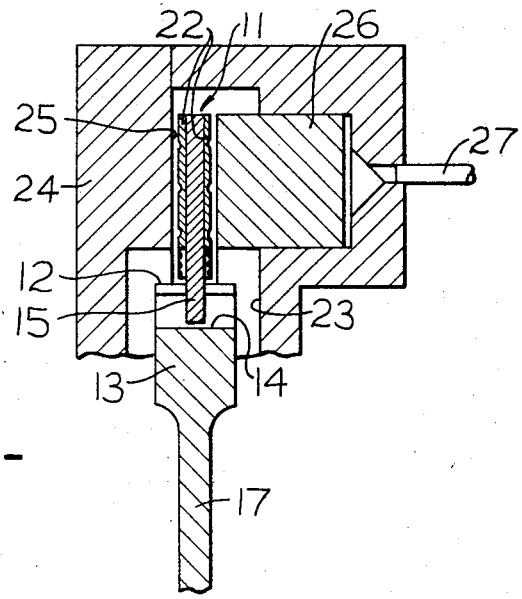
FIG. 5 is a section with parts broken away showing the employment of the novel construction in operating clutch assembly.

Working parts of a typical clutch unit are shown in FIG. 5 wherein the circular member 13 is received in a radial groove 23 of a clutch housing 24. A friction-faced segment 11 mounted in an axial groove 14 of the circular member wtih key 15 extends further into the radial slot between a smooth bearing face 25 and a hydraulically-operated thrust piston face 26. Hydraulic pressure entering line 27 behind the thrust piston face will cause the friction material 22 of the segment to be compressed between the piston face and the smooth face releasably coupling the housing with the shaft 21 on which the circular member is connected through web 17 and the associated parts previously described.

During an engagement, such as would occur in the clutch assembly shown in FIG. 5, the individual friction-faced segments 11 move independently of one another and cock slightly so that their inboard edge 16 bears on the periphery of the circular member 13. For example, referring to FIG. 4 wherein the circular member is being powered in the direction of arrow 28, the final position of the individual segments after engagement is shown. There it can be seen that the leading edge of the key 15 has lifted slightly from the bottom of groove 14 abutting on the upper portion of the groove at point A. The trailing edge of the key is abutted in the slot at points B and C, while the trailing inboard edge 16 of the segment is abutted on the periphery 12 of the circular member at point D. Through this arrangement the torque interchange is not all accomplished through the key connection. Further, the area of the friction material 22 on the individual segments can be controlled so that unacceptable loadings on the key connection between the segment and circular member can be avoided.

Figure 3:
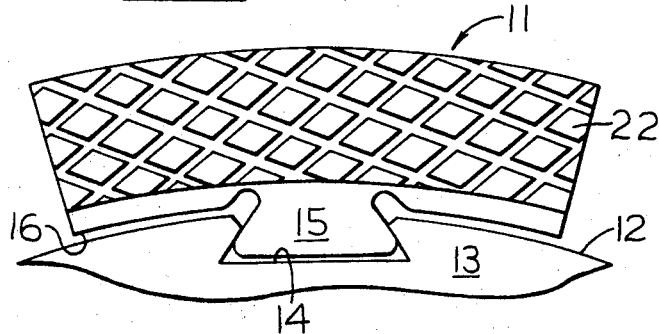
FIGS. 3 and 4 are elevations of a segment keyed to the periphery of a circular member in a nonengaged and an engaged position, respectively.
Figure 4:
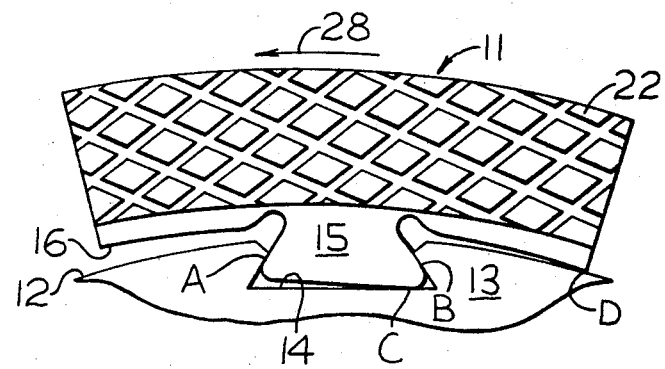

When the clutch is not engaged the individual segments positioned about the circular member 13 will be held outboard by centrifugal force in a position such as that shown in FIG. 3. During engagement the individual segment will assume the position as depicted in FIG. 4. Naturally, if the torque interchange is reversed, the individual segments will be rocked from the position shown in FIG. 4 to the reverse position, dropping their opposite inboard edge 16 against the periphery 12 of the circular member. This allows only a slight change in the angular relationship between members held by the couple.

Because of the relatively loose mounting of the individual friction-faced segments 11 in the slots 14 of circular member 13, engine vibrations are not transmitted to the segments at a magnitude comparable to those wherein the materials are mounted on a unitary disc assembly. Further, since the annular disc is composed of a plurality of non-connected segments, the disc as a unit does not have a resonant vibrational mode, as in the case of segments mounted on a unitary disc or formed into a disc by rigid assembly. Due to the arrangements of the structures in this invention, a simple and economical friction disc can be fabricated which has a longer service life and which can be employed in clutches, or the like, where vibrations are severe.

Since in normal applications the individual segments are loosely sandwiched between two surfaces such as plates or faces 25 and 26 in the nonengaged situation, the individual segments will remain aligned in a radial plane and will not skew with reference to the rotational axis of the circular member. During periods when the individual segments are not clamped between the pressure plates, they tend to align themselves axially between the pressure plates so that rubbing is minimized. Once a rub-free position is assumed by the individual segments, the centrifugal force on the individual segments will tend to maintain the rub-free position until the plates are moved together for clutch engagement. Thus, the particular structure will not lead to excessive rub between the friction material and one or the other pressure plates.

In general each segment is arcuate in shape, actually somewhat "kidney shaped" and employs a conventional friction material on its faces, such as those well known in the art. Also it is desirable that the axial grooves in the circular member which receive the keys of segments be equally spaced so that the segments can be uniformly constructed.

Having described my invention I claim:

1. An improved friction disc with an axially slidable segmented disc surrounding a common support comprising a circular support member having a plurality of axial slots circumferentially disposed in its outer periphery and a plurality of flat arcuate friction faced segments circumferentially surrounding said circular support member to form a disc composed of independent segments, each said segment having an inwardly extending key means cooperatively engaged in one of said axial slots to restrain the radial movement of its segment and allow axial movement of its segment relative to said circular support member.

2. The improved disc described in claim 1 wherein the axial slots are equally spaced circumferentially around the outer periphery of the circular support member.

3. The improved friction disc as described in claim 1 wherein the circular support member has a flat circular peripheral surface between the axial grooves and each friction segment includes a bearing surface on opposite sides of its key means to engage said peripheral surface when torque is interchanged between said circular support member and said segments.

4. An improved friction disc as described in claim 3 wherein a space is provided between adjacent segments so that adjacent segments will not contact one another during torque transfer.

5. An improved friction disc as described in claim 1 wherein each friction face segment includes a flat metal support member with conventional friction material secured to its opposite sides.

References Cited

UNITED STATES PATENTS

| | | | |
|---|---|---|---|
| 304,300 | 9/1884 | Davis | 192—107 |
| 2,330,856 | 10/1943 | Adamson | 192—107 X |
| 3,077,954 | 2/1963 | Ihnacik. | |
| 3,127,970 | 4/1964 | Allin | 192—107 |
| 3,194,347 | 7/1965 | Hall | 192—107 X |

BENJAMIN W. WYCHE III, *Primary Examiner.*